Patented Sept. 2, 1930

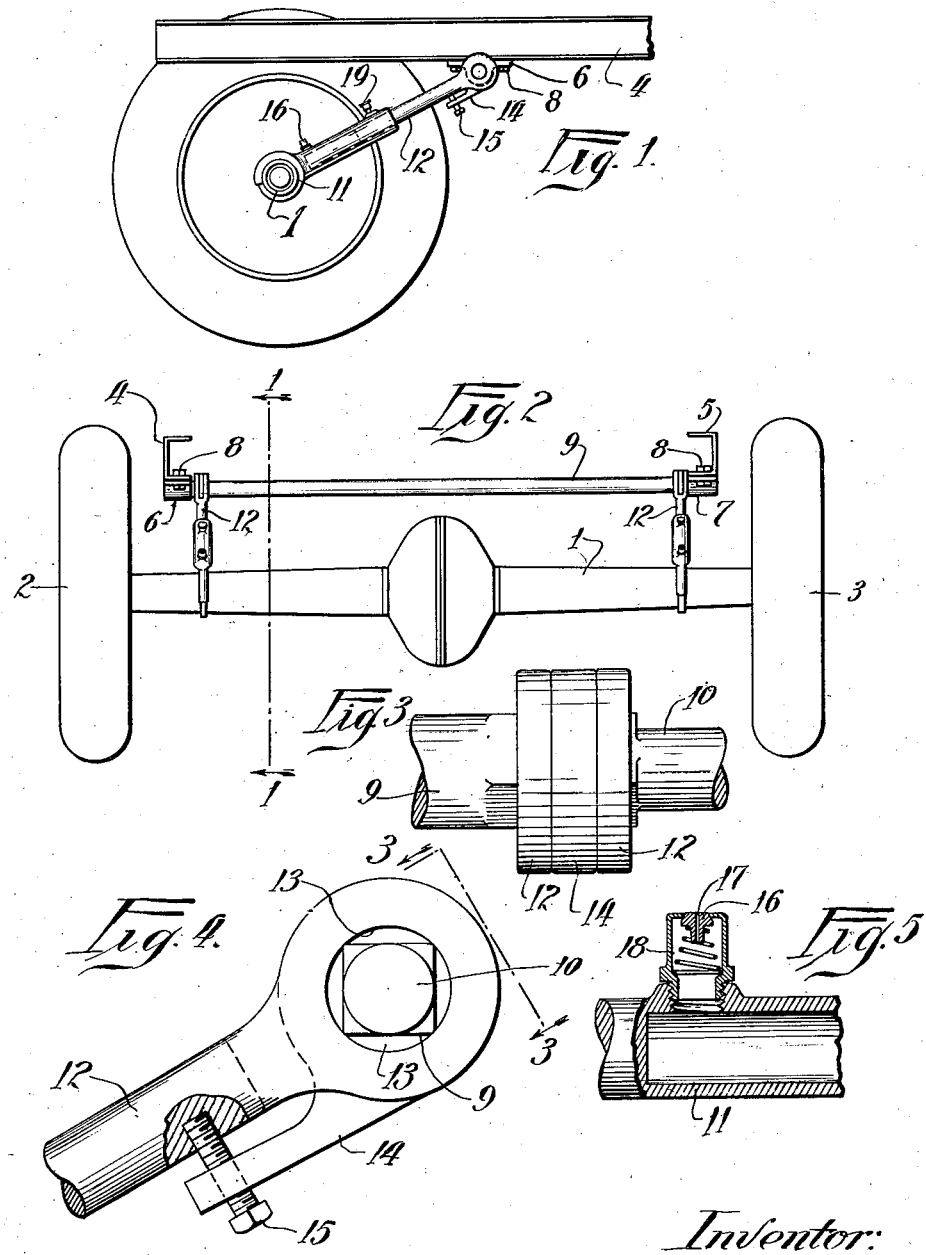

1,774,853

UNITED STATES PATENT OFFICE

FREDRICK M. SWANSEN, OF CHICAGO, ILLINOIS

AUTOMOBILE EQUALIZER

Application filed May 15, 1929. Serial No. 363,382.

This invention relates to means whereby the two sides of a chassis may be maintained in substantially the same horizontal plane, notwithstanding one of the rear wheels of the automobile drops below or is forced above the horizontal plane on which the other thereof is positioned.

Among the objects of the invention is to obtain a mechanism which will equalize the action of the springs which are interposed between the rear axle of an automobile and the chassis thereof; particularly when a greater portion of the load on said chassis is on one of said springs. A further object of the invention is to obtain mechanism whereby, when one of the rear driving wheels of an automobile drops below or is raised above the plane on which the other of said rear wheels rests, the chassis will be maintained in a substantially horizontal plane and the resulting strain on the springs interposed between the axle and the chassis will be, at least partially, distributed to the like interposed springs on the opposite side of the chassis. An additional object is to obtain mechanism of the kind described, which is simple in construction, durable and not liable to break or get out of order.

In the drawing referred to Fig. 1 is a vertical section of an axle of an automobile, of one member of the construction embodying the invention, and a side elevation of one side member of the chassis of the automobile, of one of the rear wheels of the automobile, and of one of duplicate elements embodied in the construction illustrating the invention, taken on the line 1—1 of Fig. 2, viewed as indicated by arrows. Fig. 2 is a rear elevation of the rear axle of an automobile, a cross section of the chassis thereof, and a rear elevation of a construction embodying the invention. Fig. 3 is a rear elevation of members forming elements in a construction embodying the invention, and of a portion of an additional member thereof, taken on line 3—3 of Fig. 4, viewed as indicated by arrows. Fig. 4 is a side elevation of the members illustrated in Fig. 3; and Fig. 5 is a vertical section of one end of one of the elements illustrated in Figs. 1 and 2. Figs. 3, 4 and 5, respectively, are on an enlarged scale from Figs. 1 and 2.

A reference character applied to designate a given part indicates said part throughout the several figures of the drawing wherever the same part appears.

1 represents the rear axle of the automobile to which the construction embodying this invention is attached, or on which it is mounted. 2, 3, respectively, represent the rear driving wheels of said automobile, and 4 and 5 the side members of the chassis thereof. 6, 7 represent bearings which are, respectively, rigidly attached, as by bolts or cap screws 8, to the under side of the horizontal members of the sides of the chassis. 9 represents a bar which, at its ends, as at 10 Fig. 3, is cylindrical in shape to fit closely in bearings 6, 7, respectively, but rotatable or rockable therein. The portions of parts of said bar on which the elements particularly illustrated in Figs. 3 and 4 are mounted is rectangular or many sided, to fit closely in and turn or rock with one of said elements, the other of said elements turning or rocking on said rectangular or many sided part. 11 represents a hollow member which is open at one end, to form a cylinder, and which at the other end is pivotally mounted on axle 1. 12 represents a member which fits in to the open end of member 11, to form a piston and which, at the other end is pivotally mounted on the bar 9. 13 represents a circular aperture adjacent to one end of member 12, fitting over, to turn or rock on, the rectangular or many sided part of bar 9. 14 represents a member which is provided with an aperture adjacent to one end thereof, which fits closely to the rectangular or many sided part or portion of bar 9, to turn or rock therewith. 15 represents a set screw extending through member 14, adjacent to one end thereof and into a screw threaded aperture in member 12. When the several hereinbefore described members are assembled on the axle and chassis of an automobile, the set screws 15 are turned or set in the screw threaded hole provided therefor on the under side of member 12, as is illustrated in Fig. 4, to take care of any difference in the flatness of the springs between the axle and chassis. 16, Fig. 5, represents a valve, (also shown in Fig. 1), adjacent to one end of said member 11. 17 represents an aperture in valve 16, which forms a vent permitting air which is compressed in member 11 by the inward movement of member 12 to be forced therethrough. 18 represents a spring which yieldingly holds valve 16 seated, permitting said valve to be unseated by the flow of air into said member 11 as member 12 is moved outward therefrom. 19 represents a grease cup adjacent to one end of member 11. Member 12, as previously stated, is slidable in the cylindrical portion of member 11, but fits so closely therein that when the grease cup 19 is properly supplied with grease, and said member 12 is suddenly forced into said member 11, air contained in said member 11 is compressed, the degree of said compression being controlled by the size of vent 17.

The operation of the equalizer is: when one side of the chassis of an automobile provided with the device is moved downward to flatten the spring interposed between that side and the axle, the end of bar 9 which is journalled in bearing 7 attached to the under side or face of said side of the chassis is forced down. As said end of bar 9 is forced down, members 11, 12 and 14, acting as a unit, turn around axle 1. Bar 9 is of sufficient size, in cross section, that the torsional strain thereon in said turning or rocking cannot distort it, and also said end of said bar fits so closely in said journal bearing, and said bearing is sufficiently wide, so that the opposite end of said bar 9 correspondingly turns in its bearing, (6 or 7), thereby moving members 11, 12 and 14 at said opposite end around axle 1. This movement of said members 11, 12 and 14, at said opposite end of bar 9 around the axle 1, by the turning or rocking of said bar 9 in its bearing, maintains the members 11, 12 and 14, at both ends of bar 9, in the same plane, and forces the journal bearing of said bar 9, at said opposite end, down, and thereby flattens the spring at the opposite side of the chassis and substantially equalizes the load carried by the springs which are interposed between the chassis and the axle. The same action of the several members of the device occurs when one of the wheels on the axle drops into a depression or rides over an obstruction.

I claim:

1. In an automobile equalizer, journal bearings rigidly attached to the sides of the chassis of said automobile, a bar mounted to rock in said journal bearings, two-part members pivotally mounted on said bar and on the axle of said automobile to connect said bar and axle, in combination with members rigidly mounted on said bar and means to adjust the free ends of said rigidly mounted members relative to said two-part members.

2. In an automobile equalizer, journal bearings rigidly attached to the sides of the chassis of said automobile, a bar mounted to rock in said journal bearings, two-part members pivotally mounted on said bar and on the axle of said automobile to connect said bar and axle, one of said two part members comprising a cylinder and the other comprising a piston longitudinally movable in said cylinder, in combination with members rigidly mounted on said bar and means to adjust the free ends of said rigidly mounted members relative to said two-part members.

3. In an automobile equalizer, journal bearings rigidly attached to the sides of the chassis of said automobile, a bar mounted to rock in said journal bearings, two-part members connecting said bar and said axle, one of said two-part members comprising a cylinder and the other comprising a piston longitudinally movable in said cylinder, means to control the escape of air from said cylinder and means to permit air to flow into said cylinder, in combination with members rigidly mounted on said bar and means to adjust the free ends of said rigidly mounted members relative to said two-part members.

FREDRICK M. SWANSEN.